United States Patent [19]
Shimizu et al.

[11] Patent Number: 5,894,205
[45] Date of Patent: Apr. 13, 1999

[54] ELECTRIC POWER STEERING APPARATUS

[75] Inventors: Yasuo Shimizu; Shigeru Yamawaki, both of Wako, Japan

[73] Assignee: Honda Giken Kogyo Kabushiki Kaisha, Tokyo, Japan

[21] Appl. No.: 08/980,922

[22] Filed: Dec. 1, 1997

[30] Foreign Application Priority Data

Dec. 4, 1996 [JP] Japan ................... 8-324002

[51] Int. Cl.$^6$ .................. B62D 5/04; B62D 6/00
[52] U.S. Cl. ........... 318/432; 318/430; 364/424.051; 180/446
[58] Field of Search .................. 318/430–466, 318/138, 139; 364/424.051, 424.05; 180/443, 446

[56] References Cited

U.S. PATENT DOCUMENTS

| | | | |
|---|---|---|---|
| 5,182,711 | 1/1993 | Takahashi et al. | 364/424.05 |
| 5,425,574 | 6/1995 | Sano | 303/97 |
| 5,467,281 | 11/1995 | Iwashita et al. | 364/424.05 |
| 5,612,877 | 3/1997 | Shimizu et al. | 364/424.051 |

*Primary Examiner*—Paul Ip
*Attorney, Agent, or Firm*—Merchant, Gould, Smith, Edell, Welter & Schmidt, P.A.

[57] ABSTRACT

An electric power steering apparatus includes a controller for controlling power assist of an electric motor so as to reduce a manual steering force required of the driver. The controller includes two closed control loops, one operating on the basis of a steering torque and the other on the basis of a differential value of the steering torque. The second closed control loop includes a differential torque compensator for compensating for the differentiated steering torque in such a manner as to increase the proportion of an assist torque developed in accordance with the change of the steering torque while keeping a desired degree of stability of operation of the steering system.

5 Claims, 5 Drawing Sheets

ELECTRIC POWER STEERING APPARATUS

BACKGROUND OF THE INVENTION

1. Field of the Invention

The present invention relates to an electric power steering apparatus which provides power assist of an electric motor directly to a steering system so as to reduce necessary steering power to be applied by the driver.

2. Description of the Related Art

Figure 1:
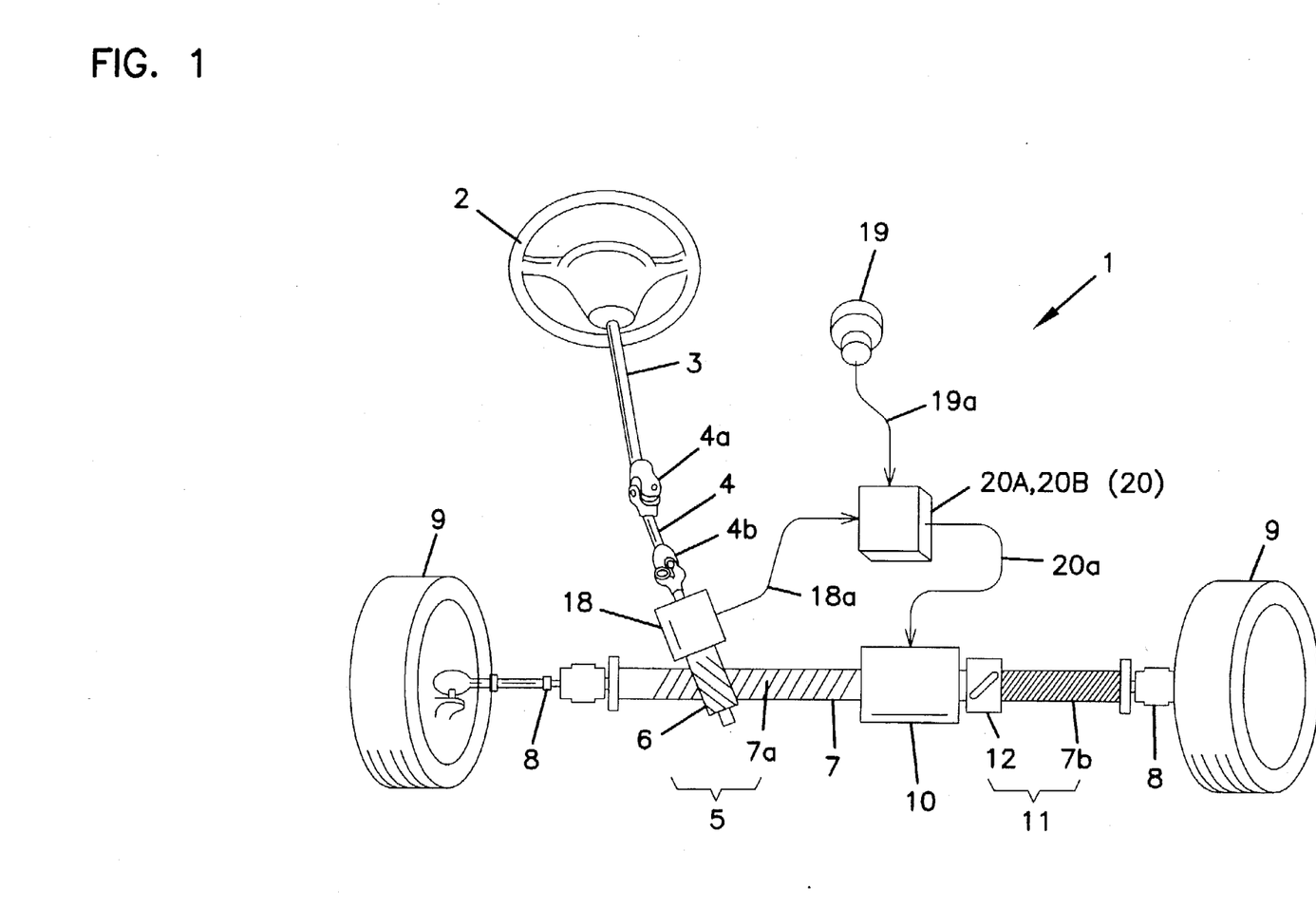
FIG. 1, is a diagrammatical view showing the general construction of an electric power steering apparatus to which the present invention pertains.

FIG. 1 of the accompanying drawings diagrammatically shows the general construction of an electric power steering apparatus of the type concerned.

The electric power steering apparatus 1 includes an electric motor 10 disposed in a steering system of the vehicle, and a controlling unit or controller 20 for controlling power assist of the electric motor 10 so as to reduce a manual steering effort or power required of the driver.

A steering wheel 2 of the vehicle is firmly connected to one end of a steering shaft 3, the opposite end of the steering shaft 3 being operatively connected through a pair of universal joints 4a, 4b to a pinion gear 6 of a rack-and-pinion mechanism 5. The rack-and-pinion mechanism 5 includes a rack shaft 7 having formed on its outside surface a row of rack teeth 7a meshing with the pinion gear 6. By means of the rack-and-pinion mechanism 5 formed jointly by the pinion gear 6 and the rack teeth 7a, rotary motion of the pinion gear 6 is translated into axial reciprocating motion of the rack shaft 7. The rack shaft 7 is connected at its opposite ends to steerable front wheels 9, 9 via a pair of tie rods 8, 8, respectively.

With this arrangement, when the steering wheel 2 is steered or turned in one direction, the front wheels 9 are caused to pivot or swing in the same direction via the rack-and-pinion mechanism 5 and the tie rods 8, thereby changing the direction of motion of the vehicle.

In order to reduce necessary steering power to be applied by the driver, the electric motor 10 for providing a steering assist torque (power assist) is disposed coaxially with the rack shaft 7 in such a manner that rotational output power of the electric motor 10 is converted via a ball screw mechanism 11 into an axial thrusting force acting on the rack shaft 7. The ball screw mechanism 11 is composed of a nut 12 connected to a rotor of the electric motor 10 for co-rotation therewith, and a screw shaft 7b formed on a part of the rack shaft 7 and threaded with the nut 12. With this arrangement, a rotational force of the nut 12 is converted via the screw shaft 7b into an axial thrusting force of the rack shaft 7. Since the steering assist torque generated by the electric motor 10 is thus converted into the axial thrusting force of the rack shaft 7, a manual steering force required of the driver to steer the front wheels 9 can be reduced.

A steering torque sensor 18 detects a manual steering torque T acting on the pinion gear 6 and generates a steering torque signal 18a indicative of the detected steering torque T. The steering torque signal 18a is supplied to the controller 20. The controller 20 generates a motor drive signal 20a on the basis of the torque signal 18a, so as to control output power of the electric motor 10 according to the motor drive signal 20a.

Figure 2:
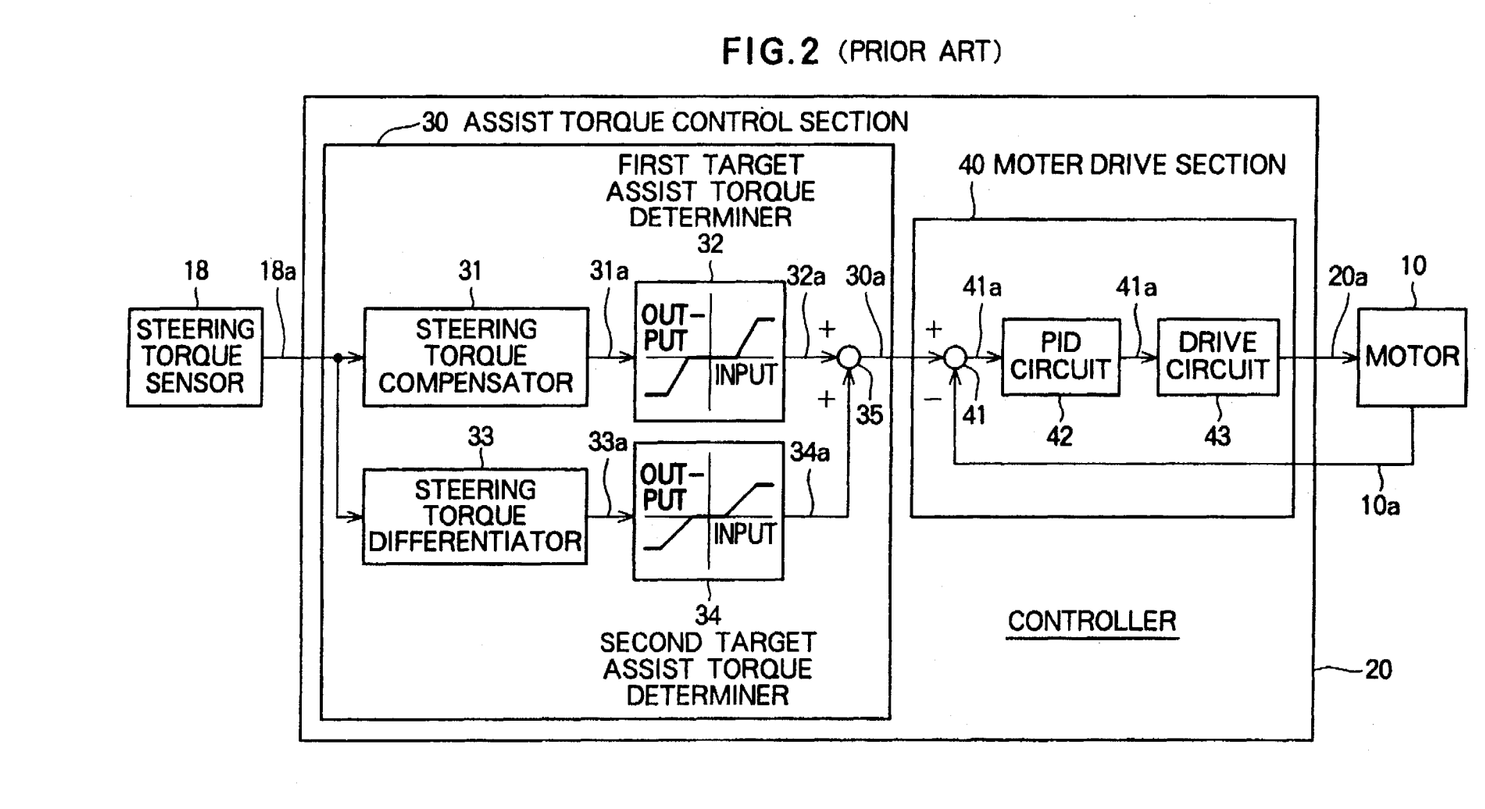
FIG. 2 is a block diagram showing a conventional control unit for use with the electric power steering apparatus shown in FIG. 1.

FIG. 2 is a block diagram showing a typical known example of the controller 20. As shown in this figure, the controller 20 generally comprises an assist torque control section 30 and a motor drive section 40. The assist torque control section 30 determines a target assist torque based on the torque signal 18a from the steering torque sensor 18 and generates a target assist torque signal 30a. The motor drive section 40 generates a motor drive signal 20a based on the target assist torque signal 30a.

The assist torque control section 30 includes a steering torque compensator 31, a first target assist torque determiner 32, a steering torque differentiator 33, a second target assist torque determiner 34, and an adding means or adder 35.

The steering torque compensator 31 undertakes compensation of the frequency characteristics of the steering torque signal 18a and generates a compensated steering torque signal 31a. To this end, the steering torque compensator 31 has a frequency characteristic so set as to stabilize operation of the steering system.

The target assist torque determiner 32 generates a first assist torque signal 32a based on the compensated steering torque signal 31a. The first assist torque signal 32a is a signal corresponding to a drive current (including the polarity thereof) of the electric motor 10 which is required for the electric motor 10 to generate a first target assist torque. The first target assist torque signal 32a may be a signal corresponding to a drive voltage of the electric motor 10 which is required for the electric motor 10 to generate the first target assist torque.

The first target assist torque determiner 32 has a steering torque vs. first target assist torque conversion table which is prepared to output a value of the first target assist torque with respect to the input of a value of the compensated steering torque. The first target assist torque determiner 32 is designed to set the first target assist torque value to be zero when the absolute value of the compensated steering torque value is smaller than a preset dead zone threshold. Alternatively, when the compensated steering torque value is greater than the preset dead zone threshold, the first target assist torque determiner 32 operates to output a first target assist torque value proportional to the compensated steering torque value. The first target assist torque determiner 32 controls the first target assist torque value so as not to exceed a preset first target assist torque upper limit even when the compensated steering torque value becomes large.

The steering torque differentiator 33 determines the amount of change in the steering torque signal 18a per unit time and outputs the determined change of the steering torque signal 18a as a differential torque signal 33a.

The second target assist torque determiner 34 outputs a second target assist torque signal 34a based on the differential torque signal 33a. The second target assist torque signal 34a is a signal corresponding to a drive current (including the polarity thereof) of the electric motor 10 which is required for the electric motor 10 to generate the second target assist torque. The second target assist torque signal 34a may be a signal corresponding to a drive voltage of the electric motor 10 which is required for the electric motor 10 to generate the second target assist torque.

The second target assist torque determiner 34 has a differential torque vs. second target assist torque conversion table which is prepared to output a value of the second target assist torque with respect to the input of a differential torque value. The second target assist torque determiner 34 is designed to set the second target assist torque value to be zero when the absolute value of the differential torque value is smaller than a preset dead zone threshold. The dead zone threshold of the second target assist torque determiner 34 is set to be smaller than the dead zone threshold of the first target assist torque determiner 32. When the differential torque value is greater than the preset dead zone threshold, the second target assist torque determiner 34 operates to output a second target assist torque value proportional to the differential torque value. The second target assist torque determiner 34 controls the second target assist torque value so as not to exceed a preset second target assist torque upper limit even when the compensated steering torque value becomes large.

The adder 35 operates to add together the first target assist torque signal 32a and the second target assist torque 32a and output the result of the adding operation as the aforesaid target assist torque signal 30a.

The motor drive section 40 is comprised of a deviation calculating circuit 41, a PID (proportional-integral-derivative control) circuit 42, and a drive circuit 43.

The electric motor 10 is equipped with a current detector (not shown) which detects a current being actually supplied to the electric motor 10 and outputs a drive current signal 10a corresponding to the detected motor current. The drive current signal 10a is fed back to the deviation calculating circuit 41 of the motor drive section 40.

The deviation calculating circuit 41 determines a deviation between the target assist torque signal 30a (i.e., a signal corresponding to a current to be supplied to the electric motor 10 to generate the target assist torque) and the drive current signal 10a, and it outputs a deviation signal 41a.

The PID circuit 42 is designed to perform specific computing operations, such as proportion, integration and differentiation on the basis of the deviation signal 41a and to output a PID control output signal 42a to the drive circuit 43.

The drive circuit 43 generates, on the basis on the PID control output signal 42a, a motor drive signal 20a and provides it to the electric motor 10 so as to supply a drive current (or a drive voltage) to the electric motor 10.

The conventional controller 20 of the foregoing construction operates to set both a first target assist torque in accordance with a steering force exerted by the driver and detected by the steering torque sensor 18, and a second target assist torque in accordance with the change of the steering force, and to control, on the basis of a target assist torque obtained by adding together the first target assist torque and the second target assist torque, an assist torque to be provided from the electric motor 10.

In the conventional controller 20, the steering torque compensator 31 is disposed immediately upstream of the first target assist torque determiner 32 so as to stabilize the operation of the steering system. Rotational power of the electric motor 10 is fed back to the steering torque sensor 18 via the ball screw mechanism 11 and the rack shaft 7. The electric motor 10, the ball screw mechanism 11, the rack shaft 7, the steering torque sensor 18, the steering torque compensator 31, the first target assist torque determiner 32, the adder 35 and motor driving section 40 are operatively connected together in the order named and jointly form a first closed control loop. In the first closed control loop, the steering torque compensator 31 undertakes compensation of the frequency characteristics in an effort to stabilize control operation of the first closed control loop.

However, when the compensated steering torque signal 31a supplied as an output from the steering torque compensator 31 has such a small level which is included in a dead zone of the first target assist torque determiner 32 (namely, smaller than the dead zone threshold), the first target assist torque signal 32a supplied from the first target assist torque determiner 32 is fixed to the value of 0 (zero). In this condition, the first closed control loop (starting from the steering torque sensor 18, then passing successively through the steering torque compensator 31, the first target assist torque determiner 32 and the motor drive section 40, and finally returning to the steering torque sensor 18), i.e., a closed loop containing the first target assist torque determiner 32 cannot undertake a prescribed closed loop control action. In other words, when the output level of the steering torque compensator 31 is in the dead zone of the first target assist torque determiner 32, the frequency characteristics compensation performed by the steering torque compensator 31 becomes totally ineffective.

There is another or a second closed loop in the controller 20, which loop starts from the steering torque sensor 18, then passes successively through the steering torque differentiator 33, the second target assist torque determiner 34, the adder 35, the motor driving section 40 and the electric motor 10, and finally returns to the steering torque sensor 18 (i.e., a closed loop including the second target assist torque determiner 34). Even when the absolute value of a steering torque value is small to such an extent as to belong to the dead zone of the first target assist torque determiner 32, if the amount of a change in the steering torque per unit time (represented by a differential torque signal 33a supplied from the steering torque differentiator 33) exceeds the dead zone threshold of the second target assist torque determiner 34, an assist torque based on the change of the steering torque will be supplied. However, the second closed loop including the second target assist torque determiner 34 does not have any means for adjusting or compensating the frequency characteristics to stabilize the control operation of the second closed loop. Accordingly, if a control operation of the controller 20 based only on the second closed loop including the second target assist torque determiner 34 is performed, the control operation tends to become unstable.

In the conventional controller 20, although an attempt was made to increase the proportion of the second target assist torque to the first target assist torque so as to provide a light feel to steering maneuvers, the result was unsatisfactory in that when steering is taken on a road having a low tire ground-contact coefficency (such as a snow-clad road) and hence requires only a small manual steering force (i.e., when the level of an output from the steering torque compensator 31 is in the dead zone of the first target assist torque determiner 32), partly due to a small frictional force acting between the road surface and the tires, and partly due to an insufficient control-loop stabilizing operation of the steering torque compensator 31, the steering system becomes unstable and sometimes causes unpleasant vibrations of the steering wheel 2. Thus, the conventional controller 20 has a limited capability of increasing the proportion of the second target assist torque to the first target assist torque in an effect to improve the comfortableness of steering maneuvers without deteriorating the stability of control operation of the steering system.

SUMMARY OF THE INVENTION

With the foregoing drawbacks in view, it is an object of the present invention to provide an electric power steering apparatus which is capable of providing a light feel to steering maneuvers while keeping a desired degree of stability of control operation of a steering system.

In brief, the electric power steering apparatus of the present invention includes a differential torque compensator provided between a steering torque differentiator and a second target assist torque determiner for compensating for the frequency characteristics of a differential steering torque signal before it is supplied from the steering torque differentiator to the second target assist torque determiner.

With this arrangement, it becomes possible to increase the proportion of an assist torque (second target assist torque) developed in accordance with a change in the steering torque (output from the steering torque differentiator) while keeping a desired degree of stability of operation of the steering system. The steering system can operate stably even when steering is taken on a low μ road surface, and provides a light, inertia-free feel to steering maneuvers.

Compensation by the differential torque compensator may be responsive to the vehicle velocity in which instance an optimum steering touch or feeling well matched to the vehicle velocity can be obtained.

It is preferable that a steering torque compensator is provided between the steering torque sensor and the first target determiner, and the steering torque compensator has a frequency characteristic different from that of the differential torque compensator. With this arrangement, a control loop operating on the basis of a steering torque and a control loop operating on the basis of a differential value of the steering torque are compensated for, each in a manner well matched to the control performance of one of these control loops.

The above and other objects, features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Certain preferred embodiments of the present invention will be described below in greater detail with reference to the accompanying drawings, wherein like reference characters designate like or corresponding parts throughout several views.

FIG. 1 shows an electric power steering apparatus 1 to which the present invention pertains. Since the mechanical structure and operation of the electric power steering apparatus 1 have already been described in conjunction with the conventional controller 20 shown in FIG. 2, further description of this power steering apparatus 1 can be omitted to avoid duplication. The electric power steering apparatus 1 includes a vehicle velocity sensor 19 and a vehicle velocity signal 18a that are used in a second embodiment of the present invention described later.

Figure 3:
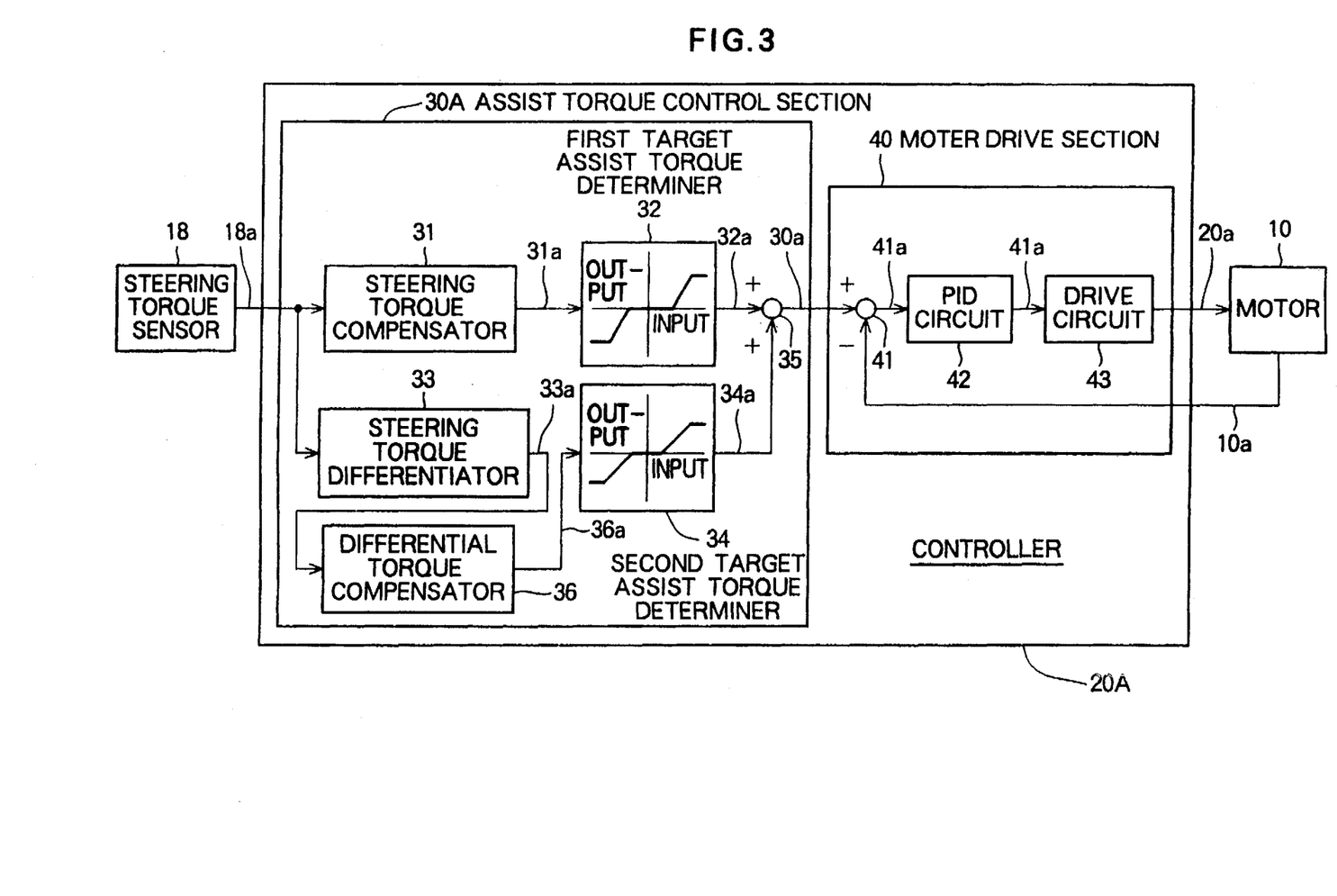
FIG. 3 is a block diagram showing a control unit, for use with the electric power steering apparatus of FIG. 1, according to a first embodiment of the present invention.

FIG. 3 shows in block diagram a control unit or controller 20A, for use with the electric power steering apparatus 1 of FIG. 1, according to a first embodiment of the present invention.

The controller 20A generally comprises an assist torque control section 30A and a motor drive section 40. The motor drive section 40 is structurally and operationally the same as the one previously described with respect to the conventional controller 20 shown in FIG. 2, and further description thereof can be omitted to avoid duplication.

The assist torque control section 30A differs from the conventional one 30 shown in FIG. 2 in that a differential torque compensator 36 is provided between a steering torque differentiator 33 and a second target assist torque determiner 34.

The differential torque compensator 36 is designed to compensate for or correct the frequency characteristics of a differential torque signal 33a fed from the steering torque differentiator 33 and to output a compensated differential torque signal 36a. The compensated differential torque signal 36a is supplied to the second target assist torque determiner 34.

The differential torque compensator 36 preferably comprises a phase-compensating circuit or a low-pass filter. The compensated differential torque signal 36a supplied from the differential toque compensator 36 is a signal which is developed by attenuating an undesired frequency component of the differential torque signal 33a.

Figure 5A:
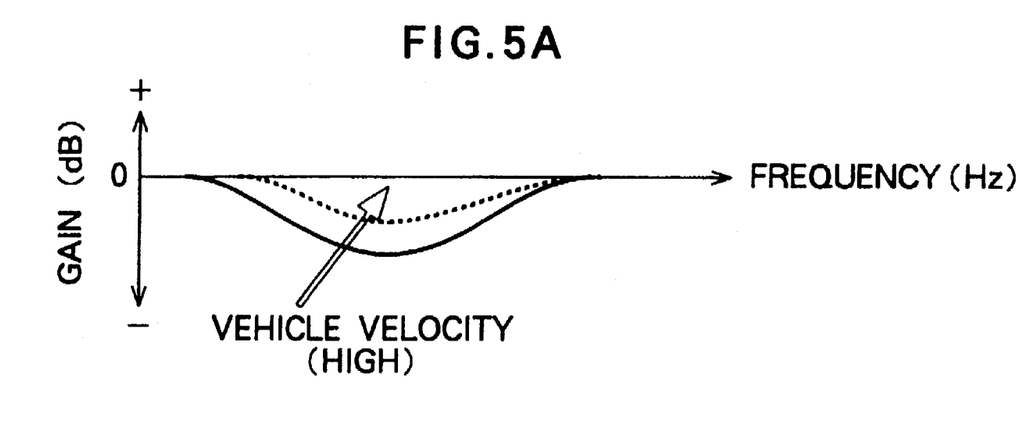
FIG. 5A is a graph illustrative of the manner in which a differential torque compensator performs correction of the frequency characteristics in accordance with the gain of a differential torque signal.
Figure 5B:
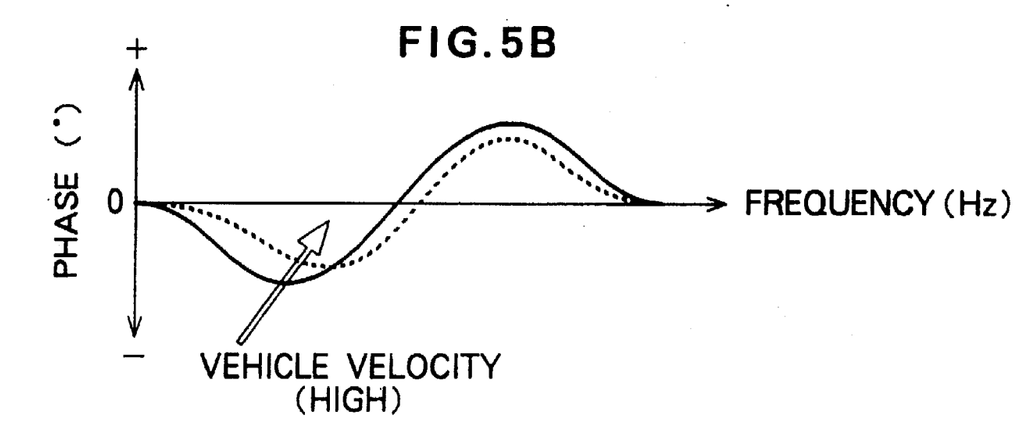
FIG. 5B is a graph illustrative of the manner in which the differential torque compensator performs correction of the frequency characteristics in accordance with the phase of the differential torque signal.

Two typical examples of the frequency characteristics compensation or correction performed by the differential torque compensator 36 are indicated by two solid-lined curves shown in FIGS. 5A and 5B, respectively. The correcting characteristics of gain and phase of the frequency are set in consideration of the control characteristics of a closed loop containing (or passing) the second target assist torque determiner 34, so as to stabilize control operation of this closed loop.

The steering torque compensator 31, the steering torque differentiator 33 and the differential torque compensator 36 may be formed by electronic circuits. An analog torque signal 18a generated from the steering torque sensor 36 may be converted by an analog-to-digital (A/D) converter (not shown) into a digital torque signal which in turn is used in digital computing operations to perform compensation of a steering torque, differentiation of the steering torque and compensation of a differential torque. In this instance, the steering torque compensator 31, steering torque differentiator 33 and differential torque compensator 36 may be formed by digital filters or digital operating circuits used in combination with control software.

As described above, the controller 20A according to the first embodiment of the present invention includes a differential torque compensator 36 provided between the steering torque differentiator 33 and the second target assist torque determiner 34. By the differential torque compensator 36, the frequency characteristics of the differential torque signal 33a are modified or corrected so as to stabilize control operation of a closed loop control system containing the second target assist torque determiner 34. With this arrangement, it becomes possible to increase the proportion of an assist torque (second target assist torque) developed in accordance a change in the steering torque (an output from the steering torque differentiator 33) while keeping a desired degree of operational stability of the steering system.

Accordingly, even when steering is taken on a low μ road surface (i.e., road surface having a small tire ground-contact coefficient μ), a light, inertia-free feel to steering maneuvers can be attained while keeping a desired degree of stability in operation of the steering system.

The steering torque compensator 31 has a frequency modifying or correcting characteristic which is set in consideration of the control characteristics of a first closed control loop including the first target assist torque determiner 32, so as to stabilize control operation of the first closed control loop. The differential torque compensator 36 has frequency modifying or correcting characteristics which are set in consideration of the control characteristics of a second closed control loop containing the second target assist torque determiner 34, so as to stabilize control operation of the second closed control loop. Since the steering torque compensator 31 and the differential torque compensator 36 have different frequency characteristics, compensation can be performed in an appropriate manner well suited for the control characteristics of each of the first closed control loop operable based on a steering torque and the second closed control loop operable based on a differential value of the steering torque.

Figure 4:
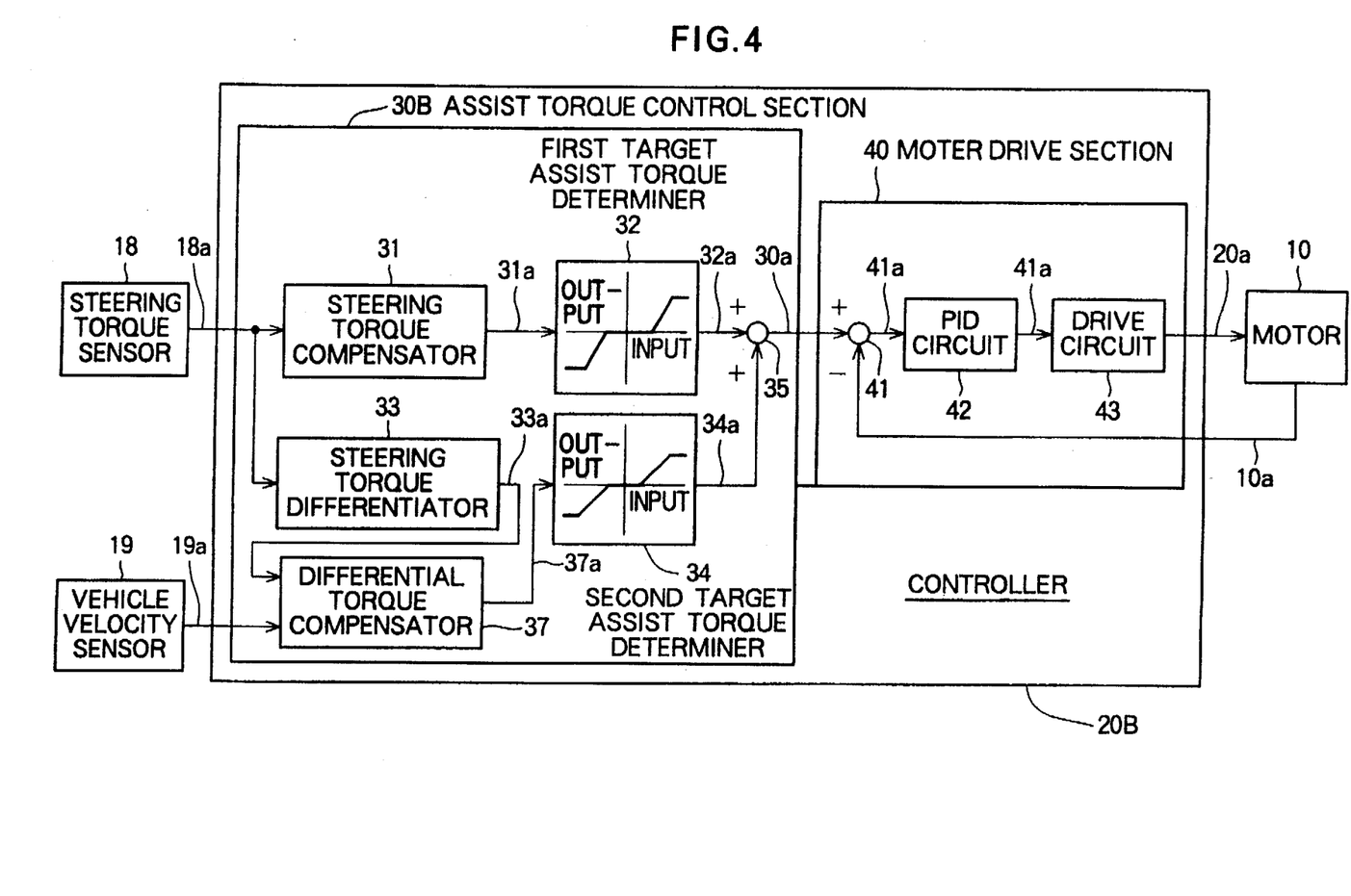
FIG. 4 is a block diagram showing a modified control unit, for use with the electric power steering apparatus of FIG. 1, according to a second embodiment of the present invention.

FIG. 4 shows in block diagram a controller 20B, for use with the electric power steering apparatus shown in FIG. 1, according to a second embodiment of the present invention.

The controller 20B comprises an assist torque control section 30B and a motor drive section 40.

The controller 20A generally comprises an assist torque control section 30B and a motor drive section 40. The motor drive section 40 is the same in construction and operation as the one previously described with respect to the conventional controller 20 shown in FIG. 2, and no further description thereof will be set forth here to avoid duplication.

The assist torque control section 30B differs from the conventional one 30 shown in FIG. 2 and from the one 30A of the first embodiment shown in FIG. 3 in that a differential torque compensator 37 of the vehicle-velocity responsive type is provided between a steering torque differentiator 33 and a second target assist torque determiner 34.

The vehicle-velocity responsive, differential torque compensator 37 is designed to vary the amount of modification or correction of the frequency characteristics of a differential torque signal 33a supplied from the steering torque differentiator 33, on the basis of a vehicle velocity signal 19a supplied from a vehicle velocity sensor 19. In the illustrated embodiment, this compensator 37 is designed to decrease the degree of attenuation of the gain in a particular frequency range with an increase in the vehicle velocity.

FIGS. 5A and 5B are graphs illustrative of the manner in which the gain (FIG. 5) and the phase (FIG. 5B) of the frequency characteristics are modified or corrected at the differential torque compensator. In these figures, broken-lined curves represent frequency characteristics at a higher vehicle velocity, and the solid-lined curves represent frequency characteristics at a lower vehicle velocity.

In the graph shown in FIG. 5A, the horizontal axis represents the frequency, and the vertical axis represents the gain of the differential torque compensator 37. The differential torque compensator 37 compensates for a differential torque signal 33a supplied thereto by attenuating the gain in a particular range of frequencies, for example, from 10 Hz to 50 Hz, and outputs the compensated signal as a differential torque correction signal 37a. The differential torque compensator 37 is designed to set the amount of attenuation of the above-mentioned particular frequency component at a large value when the vehicle velocity is low, the amount of attenuation of the above-mentioned particular frequency component being set to become smaller as the vehicle velocity increases. Thus, as the vehicle velocity increases, frequency components of the differential torque correction signal 37a supplied to the second target assist torque determiner 34 become close to frequency components of the differential torque signal 33a.

In the graph shown in FIG. 5B, the horizontal axis represents the frequency, and the vertical axis represents the phase. The differential torque compensator 37 compensates for a differential torque signal 33a supplied thereto, in such a manner that the phase in a particular range of frequencies, for example, from 5 Hz to 20 Hz, is delayed, while the phase in another particular range of frequencies, such as from 20 Hz to 60 Hz is advanced. The thus compensated signal is outputted from the differential torque compensator 37 as a differential torque correction signal 37a. The differential torque compensator 37 is designed to set the amount of delay or advance in phase at a large value when the vehicle velocity is low, the amount of delay or advance in phase being set to become smaller as the vehicle velocity increases. Thus, as the vehicle velocity increases, frequency components of the differential torque correction signal 37a supplied to the second target assist torque determiner 34 become close to the frequency components of the differential torque signal 33a.

It appears clear from FIGS. 5A and 5B that since the degree of change or correction performed by the vehicle-velocity responsive, differential torque compensator 37 is set to become smaller as the vehicle velocity increases, steeling taken in a high vehicle speed condition provides lighter feel to steering maneuvers than steering taken in a low vehicle speed condition.

The steering torque compensator 31 has a frequency correcting characteristic which is set in consideration of the controlling characteristics of a first closed control loop including the first target assist torque determiner 32, so as to stabilize controlling operation of the first closed control loop. On the other hand, the differential torque compensator 37 has a frequency correcting characteristic which is set in consideration of the controlling characteristics of a second closed control loop including the second target assist torque determiner 34, so as to stabilize controlling operation of the second closed control loop. Thus, since the frequency characteristic of the steering torque compensator 31 differs from the frequency characteristic of the differential torque compensator 37, the first closed control loop operating based on the steering torque and the second closed control loop operating based on the differential steering torque are compensated for, each in a manner well matched to the controlling characteristics of one of these closed control loops.

As described above, according to the electric power steering apparatus of the present invention, by virtue of a differential torque compensator disposed between a steering torque differentiator and a second target assist torque determiner, it becomes possible to increase the proportion of an assist torque (second target assist torque) in response to the change in steering torque (the output of the steering torque differentiator) while keeping a desired degree of operational stability of the steering apparatus. Accordingly, even when steering is taken on a low μ road surface (i.e., road surface having a small tire ground-contact coefficient μ), a light, inertia-free feel to steering maneuvers can be obtained with continuing stable operation of the steering system.

Furthermore, by using a differential torque compensator capable of varying the degree of compensation in response to the vehicle velocity, it is possible to obtain an optimum steering touch or feeling well matched to the vehicle velocity.

Additionally, a steering torque compensator is provided between the steering torque sensor and the first target determiner, and the steering torque compensator has a frequency characteristic different from that of the differential torque compensator. With this arrangement, a control loop operating on the basis of a steering torque and a control loop operating on the basis of a differential value of the steering torque are compensated for, each in a manner well matched to the control performance of one of these control loops. The differential torque compensator dealing with a change in the steering torque (output from the differential torque differentiator) and the steering torque compensator dealing with a steering torque signal are provided independently and in parallel with each other. With this arrangement, even when a delay in phase occurs in the steering torque compensator side, control operation is performed based on a change in the steering torque without being influenced by the phase delay at the steering torque compensator side. Thus, an inertia-free, light feel to steering maneuvers can be obtained. Additionally, since the dead zone of the first target assist torque determiner, which determines a first target assist torque on the basis of the steering torque signal, can be set in option, it is possible to provide a highly stable feel to steering maneuvers.

Obviously, various minor changes and modifications are possible in the light of the above teaching. It is to be understood that within the scope of the appended claims the present invention may be practiced otherwise than as specifically described.

What is claimed is:

1. An electric power steering apparatus, comprising:
   (a) an electric motor for providing an assist torque to a steering system of a vehicle;
   (b) a torque sensor for detecting a steering torque applied to said steering system and generating a steering torque signal;
   (c) an assist torque control section for, based on said steering torque signal generated from said steering torque sensor, determining a target assist torque to be provided by said electric motor so as to generate a target assist torque signal; and
   (d) a motor drive section for driving said electric motor based on said target assist torque signal generated from said assist torque control section, wherein said assist torque control section includes
   (i) first target assist torque determining means for, based on said steering torque signal generated from said torque sensor, determining a first target assist torque so as to provide a first target assist torque signal,
   (ii) steering torque differentiating means for, based on said steering torque signal generated from said steering torque sensor, differentiating said steering torque so as to generate a differential torque signal,
   (iii) second target assist torque determining means for, based on said differential torque signal generated from said steering torque differentiating means, determining a second target assist torque so as to provide a second target assist torque signal,
   (iv) adding means for adding said first target assist torque signal and said second target assist torque signal to determine said target assist torque, and
   (v) differential torque compensating means provided between said steering torque differentiating means and said second target assist torque determining means for compensating for frequency characteristics of said differential torque signal before it is supplied from said steering torque differentiating means to said second target assist torque determining means.

2. An electric power steering apparatus, according to claim 1, further including a vehicle velocity sensor for detecting a velocity of the vehicle so as to generate a vehicle velocity signal, wherein said differential torque compensating means compensates for said frequency characteristics of said differential torque signal in response to said vehicle velocity signal.

3. An electric power steering apparatus, according to claim 2, wherein said differential torque compensating means operates to decrease the degree of attenuation of the gain in a particular frequency range with an increase in the vehicle velocity.

4. An electric power steering apparatus, according to claim 2, wherein said differential torque compensating means operates to decrease the amount of delay or advance in phase in a particular frequency range with an increase in the vehicle velocity.

5. An electric power steering apparatus, according to claim 1, further including a steering torque compensating means disposed between said steering torque sensor and said first target assist torque determining means for compensating for the frequency characteristics of said steering torque signal, said steering torque compensating means having a frequency characteristic which is different from a frequency characteristic of said differential torque compensating means.

* * * * *